Figure 1:
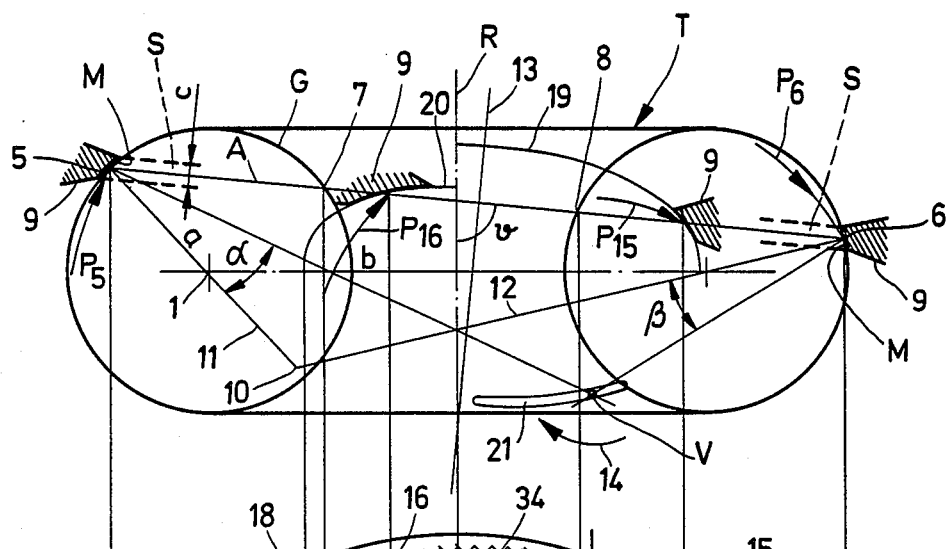

United States Patent [19]

Kreij

[11] Patent Number: 4,480,815
[45] Date of Patent: Nov. 6, 1984

[54] SEALING DEVICE FOR VALVES

[75] Inventor: Sven E. Kreij, Linköping, Sweden

[73] Assignee: Saab-Scania Aktiebolag, Linköping, Sweden

[21] Appl. No.: 444,583

[22] PCT Filed: Apr. 23, 1982

[86] PCT No.: PCT/SE82/00130
§ 371 Date: Nov. 19, 1982
§ 102(e) Date: Nov. 19, 1982

[87] PCT Pub. No.: WO82/03899
PCT Pub. Date: Nov. 11, 1982

[51] Int. Cl.³ .................... F16K 15/03; F16K 1/226
[52] U.S. Cl. .................................... 251/298; 251/306
[58] Field of Search ............... 251/298, 305, 306, 307

[56] References Cited

U.S. PATENT DOCUMENTS

| | | | |
|---|---|---|---|
| 2,888,036 | 5/1959 | Reppert | 251/298 |
| 3,172,424 | 3/1965 | Stillwagon | 251/298 |
| 3,809,361 | 5/1974 | Pfundstein et al. | 251/305 |
| 4,036,469 | 7/1977 | Robinson | 251/306 |
| 4,121,607 | 10/1978 | Bader | 251/298 |

Primary Examiner—Martin P. Schwadron
Assistant Examiner—James R. Shay
Attorney, Agent, or Firm—James E. Nilles; James R. Custin

[57] ABSTRACT

A sealing device for valves comprises two co-acting sealing surfaces one of which is arranged facing outwards on a valve body which is pivotally mounted in the valve housing, and the other forming an inwards-facing surface on the seat arranged in the valve housing. When the valve is closed the two sealing surfaces are pressed against each other with a wedge-wise engagement along an engagement line or engagement zone. According to the invention at least one of the sealing surfaces is formed as a segment (S) of a toroidal figure (T) which is defined by a convex or concave curved line (G) which is rotated as a generatrix around an axis of rotation (R), out of which figure the segment is cut so that a plane (A) through the sealing surface, along which the engagement line or engagement zone is located when the valve is closed, is inclined relative to the axis of rotation (R) and is bounded in each and every direction from the latter by the curved line.

4 Claims, 4 Drawing Figures

SEALING DEVICE FOR VALVES

The present invention relates to a sealing device for valves, comprising a valve housing which forms a through-duct with a round cross-section and wherein there is a valve seat disposed along a plane which intersects the through-duct, and a valve member which can be moved towards and away from a position in which the valve is closed and an outwardly facing sealing surface on the valve member engages an inwardly facing sealing surface on the valve seat, the valve member being pivotable around a pivot axis which is located on one side of the seat plane and preferably extends parallel thereto, and the two sealing surfaces being pressed against each other wedge-wise along an engagement line or an engagement zone when the valve is closed. The invention, which can be used in butterfly valves serving as shut-off or regulating devices as well as in non-return valves, relates more specifically to a new geometric design for one or both of the sealing surfaces comprised in the sealing device.

A number of butterfly valve designs have appeared wherein, with the aim of obtaining good sealing qualities, the two sealing surfaces have been designed so that they can be pressed against each other when the closed position is assumed. According to a line of development which has been followed for a long time by several manufacturers, the valve seat has been made so that its inwardly facing surface which co-acts with the periphery of the valve flap is in the shape of the envelope surface of a truncated cone, the axial line of the cone being disposed at an oblique angle to the plane of the seat. The sealing surface of the seat, like the engagement line or engagement zone thereon along which the two sealing surfaces are pressed against each other in the closed position, is therefore defined by an elliptical section and naturally, with such a geometrical shape for the seat, the effective sealing surface on the periphery of the valve flap must also have an elliptical shape, viewed in the plane of the seat. This gives rise to problems in the production of the sealing surfaces in a machine tool. Moreover, it can prove difficult to make the flap statically balanced. This construction is described in German Patent Specification No. 1 198 630, and elsewhere.

In order to avoid these problems other designs have been developed, comprising conical sealing surfaces in which full use is made of the functional advantages which can be gained from the tightening of the engagement in such sealing devices. Such a solution, described in Swedish Pat. No. 7404594-9 (publ. No. 400 356), entails the sealing surface of the seat being given a rotationally asymmetric cone shape which is geometrically defined by an oblique circular cone, the base of which coincides with the plane of the seat which lies closest to the pivot axis of the valve flap. The base, like every section which extends parallel to the base and intersects the sealing surface, therefore has a circular shape which enables it to be machined in a machine tool in a process where the valve housing and the cutting tool carry out a relative rotary movement during which the rotation centre of the valve housing is displaced continuously so that it is guided towards the apex of the cone. Since in this case the other sealing surface also has a circular shape the problem with the machining of the valve flap is eliminated.

The sealing device which is described in Swedish Pat. No. 7313937 (publ. No. 383 402) is closely related to this. In this device there is again a sealing surface with a rotationally asymmetric cone shape, but this is arranged on the periphery of the valve flap and faces outwards, while the valve seat is constructed with a narrow inwards-facing sealing surface bounded by a circular opening. Here again the two sealing surfaces will have an increasing pressure of abutment against each other along an engagement line or engagement zone which is substantially circular, as the valve is being closed and the valve flap periphery is pivoted into the opening in the seat.

Although the last-named valve design has considerable merits in several respects, it does not provide a complete solution to the production problems. The above-mentioned process which is used for machining the rotationally asymmetric sealing surfaces is expensive compared with conventional machining in a lathe, for example, and the special equipment which is required in the machine tool also increases the cost of the finished product.

Another disadvantage which is also a result of the rotationally asymmetric cone shape is the difficulty in achieving with a machine the very fine surface finish which the conical surface must have in all cases where a good seal is demanded of the flap-valve. However, the said cone shape does not allow it to be finished by lapping it against a tool known as a master, and it is necessary instead to resort to more manual methods for the final finishing of the surface.

The present invention has for its object to provide an improved sealing device for use in valves of the kind described in the introduction, which will be simpler and cheaper to produce than the valve constructions which have existed until now. The aim here is primarily to make it possible for the sealing surfaces in the device to be produced entirely by machine with conventional machining methods and tools, by means of a new geometrical shaping of the sealing surface which fulfils the requirement that a tightening of the engagement can be effected. It is desirable therewith that it should be possible to fully finish the sealing surfaces to the required fine surface finish by machine. A further object of the invention is to find a sealing surface shape which is geometrically simple and allows the valve flap to operate at a large contact angle but still to be substantially statically balanced.

These objects are achieved in that, in accordance with the primary characteristic of the invention, at least one of the sealing surfaces is formed as a segment of a toroidal figure which is defined geometrically by a convex or concave curved line which is rotated as a generatrix around an axis of rotation, out of which figure the segment is imagined to be cut in such a way that a plane through the sealing surface along which the engagement line or engagement zone is located when the valve is closed is inclined relative to the axis of rotation and is defined in each arbitrary direction from the latter by a point on the curved line.

In an embodiment which is to be preferred for non-return valves the sealing device according to the invention is characterised in that, at least over the section which corresponds to the engagement zone, its two sealing surfaces are congruent or almost congruent and have the said toroidal shape, one surface being convex and the other concave. This makes it possible to carry out mutual lapping of the pair of sealing surfaces which are to be incorporated in the finished valve while the valve is being assembled, so that these surfaces are thus individually adapted to each other and provide a satisfactory seal.

From the production point of view it may also be advantageous to make the curved line which forms the generatrix for the toroidal figure out of which the sealing surface segment is cut as the arc of a circle.

According to another characteristic of the invention a sealing surface is incorporated in the sealing device which, at least over the section which corresponds to the engagement zone, has the above-mentioned toroidal shape while the other sealing surface is shaped as a ring with a cross-section curvature which is substantially greater than the curvature of the curved line of the toroidal surface, so that the engagement between the two sealing surfaces occurs over a narrow zone and is comparable with linear contact. With this configuration the sealing device is particularly suitable for shut-off valves and other instances where a high specific sealing surface pressure should be achieved.

In order that the sealing surfaces in this configuration should have simultaneous contact around the circumference so that sliding between the surfaces is prevented, the said other sealing surface, viewed in a plane which coincides with the engagement line or engagement zone, has an oval shape with the long axis located along the pivot axis and corresponding substantially to the ovality of the toroidally shaped surface.

Figure 2:
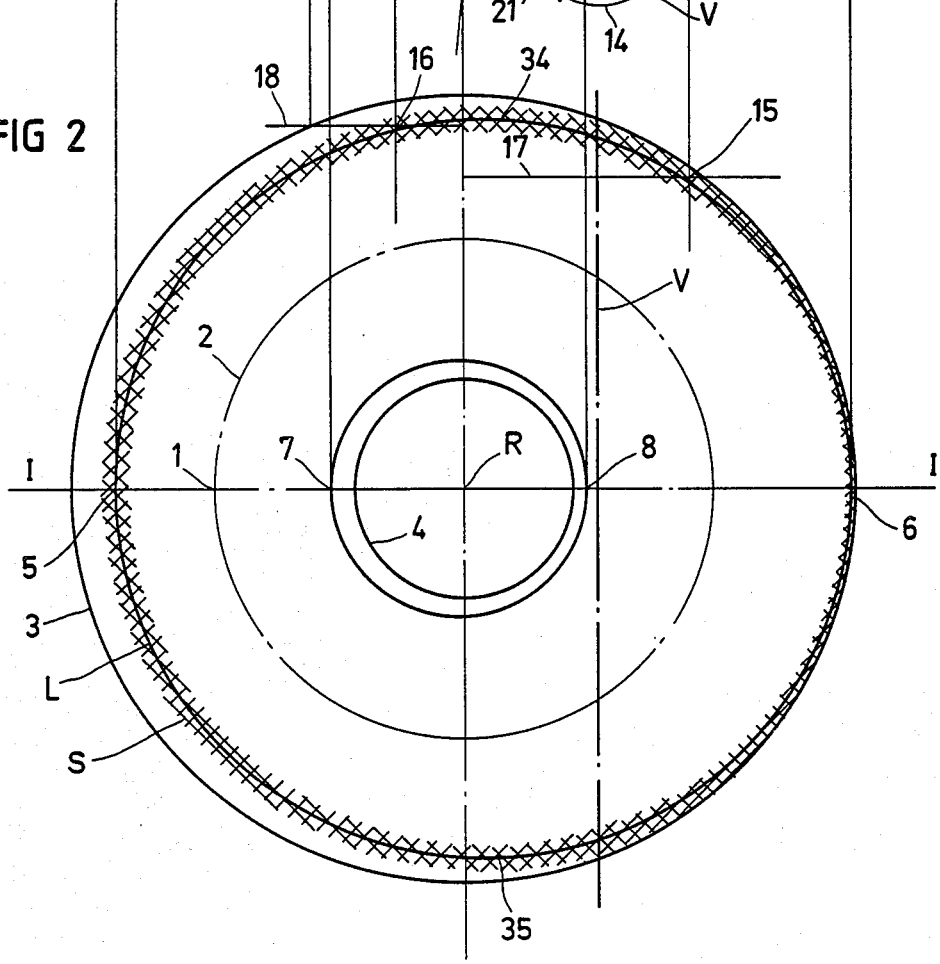

The invention will now be explained further with reference to the accompanying drawing, on which FIGS. 1-2 show the basic design and functioning of the sealing device according to the invention.

Figure 3:
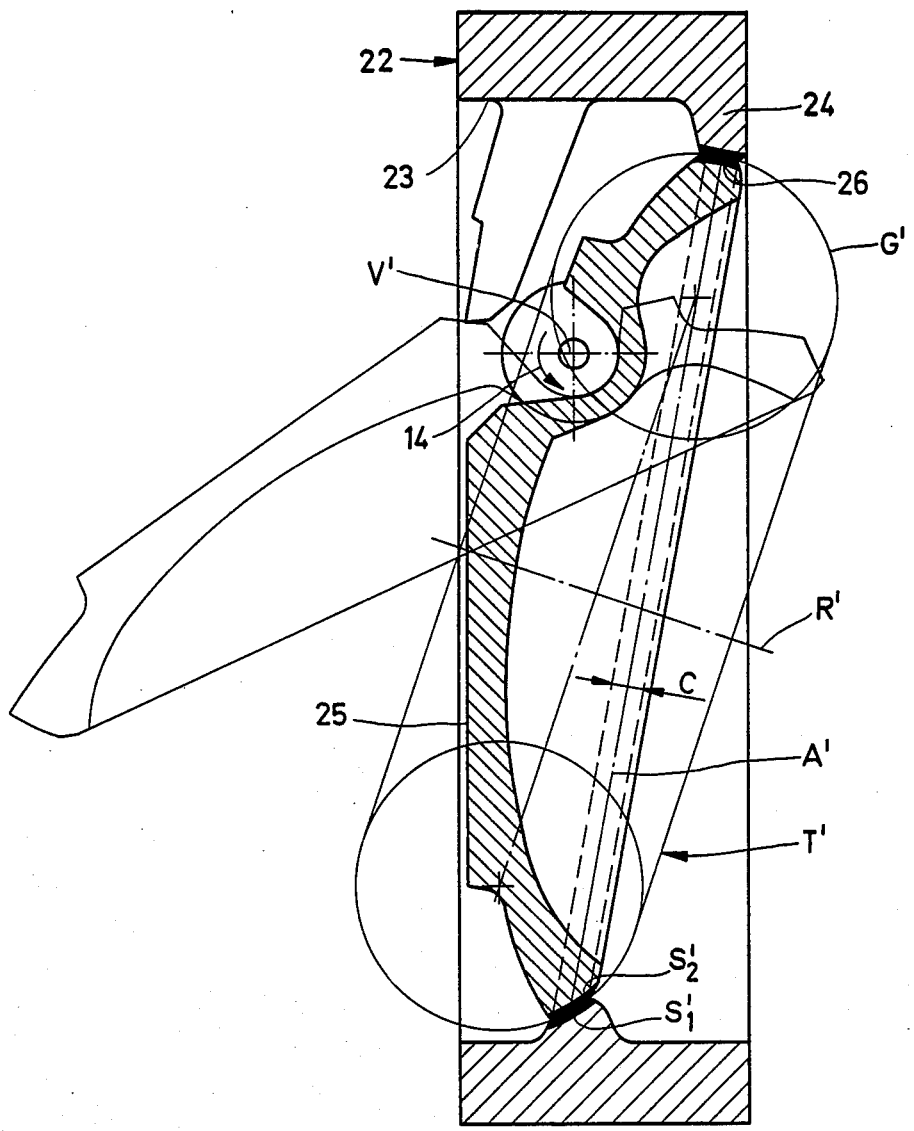
Figure 4:
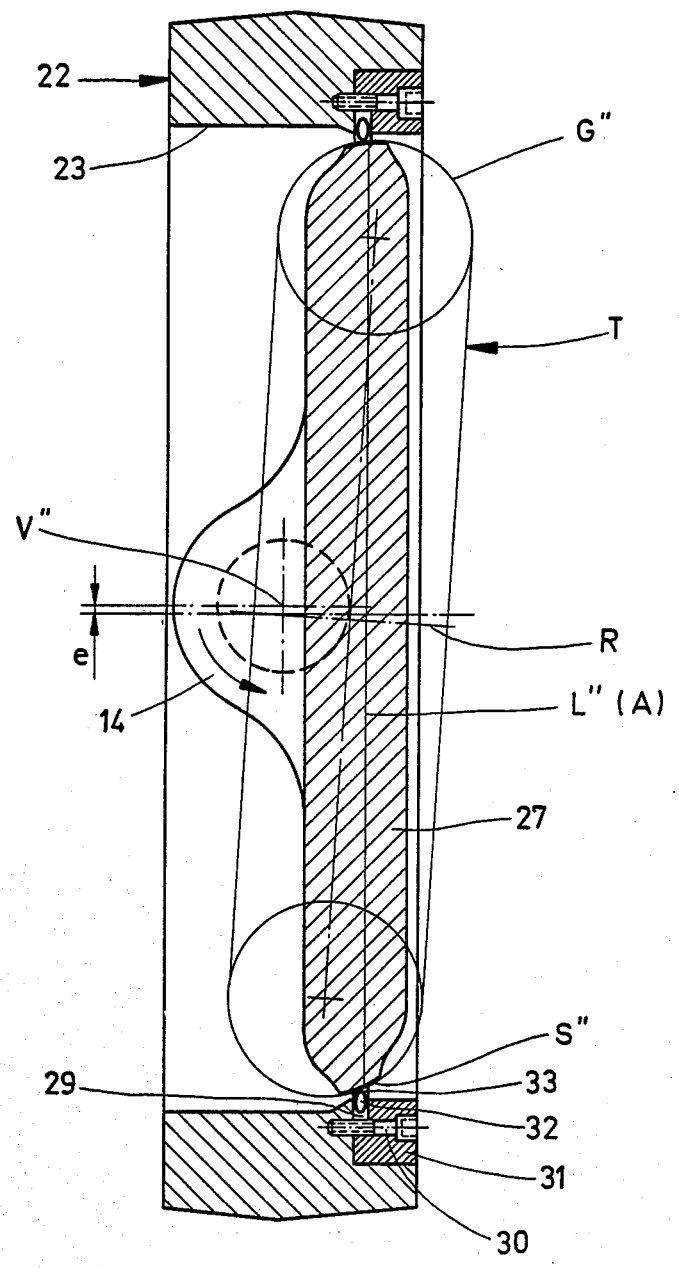

FIG. 3 is a longitudinal section through a non-return valve containing a sealing device according to the invention, and FIG. 4 illustrates the application of the invention in a flap-valve.

Basically, a sealing device according to the invention comprises two sealing surfaces which may be made to abut tightly wedge-wise against each other. With reference to FIGS. 1-2 it will first be shown how two such sealing surfaces are designed, and how they co-act.

FIG. 1 shows geometrically the sealing device in a plane of symmetry which is assumed to be vertical and extends along the line I—I in FIG. 2 through an axis R, while FIG. 2 is a projection on a horizontal plane, that is to say, it is perpendicular to the same axis. A curved line, preferably the arc of a circle, is designated G, and is shown in the example as a closed circle with its plane lying in the plane of symmetry and its centre at the point 1. The curved line need not necessarily have constant curvature, but although the curvature may vary or approach nil it is a condition here that the curved line must be generally convex or generally concave, i.e. without a point of inflexion.

If the curved line G as the generatrix is rotated around the axis R, so that the point 1 moves along the circular guide line 2 in FIG. 2 while the plane of the curved line rotates, always passing through the axis, the curved line generates a toroidal figure T, the contour of which in the horizontal projection is bounded by the outer and inner diameters 3 and 4 respectively and, analogously with this, every cutting plane which extends parallel with the plane of the guide line 2 (i.e., normal to axis R) intersects two circles concentric with the axis of rotation R. It is here to note that the relationship between the radius of curvature a of the generatrix G and the radius b of the guide line 2, that is, the distance between the point 1 and the axis R, can be varied within wide limits. The more the latter radius is reduced, the more the shape of the toroid is altered in that the opening in the middle disappears increasingly and in the plane of symmetry the figure becomes apple-shaped, with two halves which cut into each other increasingly as b approaches nil. Such a shape, having the relationship $a/b > 1$, can be used as the basis for the shaping of the sealing surface just as well as a toroidal figure where the radius of curvature a is small, relatively speaking. Which radius ratio is chosen depends on the application.

According to the primary characteristic of the invention, a segment is cut from the toroidal figure T in a particular way which determines the shape of at least one of the sealing surfaces of the sealing device. A plane A is thereby placed through the toroid so that it is inclined relative to the axis of rotation R, forming with the latter a non-right angle v, viewed in the plane of symmetry in FIG. 1, while cutting the said plane of symmetry at right-angles. The angle of inclination of the plane A and its position in the vertical direction must fall within limits which depend on the above-mentioned radius ratio a/b and which satisfies the condition that the intersection of the plane with the toroidal figure be defined in each and every direction from the axis of rotation R by a point on the curved line or the generatrix G, and then this intersection which is shown in FIG. 2 by the line L and passes through the outer intersection points 5 and 6 in FIG. 1 forms a closed curve which extends continuously and may have a certain ovality dependent on the shape of the toroidal figure.

In the following the intersection line L represents an average sealing line for the sealing device, this being generally taken to mean the peripheral engagement line where ideally sealing will occur between the two sealing surfaces of the device when these are made to engage each other. However, such a line contact engagement between the surfaces is scarcely possible or even desirable in actual practical applications, and the expression "average sealing line" can therefore, from the technical point of view, mean a narrow zone which runs round the two co-acting sealing surfaces, like a strip. Normally, for practical or functional reasons, these are given a width which is far greater than the width of their effective engagement zone.

Starting from the intersection L (representing in the example the engagement line or engagement zone of the sealing device) design can therefore proceed by laying out, symmetrically relative to the intersection, a segment S extending round the toroid and having a width, shown in FIG. 1 with the measurement c, equal to the predetermined width of the sealing surface. If the toroid T is considered as a body, then in the example a sealing surface will obviously be obtained which is outwards-facing and has a convex shape, viewed in every vertical plane that contains the axis of rotation R.

For the sake of completeness it should be mentioned that with a toroid like that shown in the example there is another design which also fulfils the condition of providing an intersection and a segment which extends continuously around the toroid. In this alternative case the intersection extends through the inner intersection points 7 and 8 with the plane A, and a segment drawn in this way, which can be considered to be an inwards-facing part of the toroid T, can also be used as a sealing surface.

As the example in FIGS. 1-2 shows, a sealing surface formed as the segment S can be combined with another surface M which is congruent with the first-named surface, but facing counter to it, so that it could be said to be a moulding from the segment S. Such a combination can also occur in the alternative just mentioned above, the convex, inwards-facing surface which passes through the points 7 and 8 being paired with a counter-facing concave sealing surface. Alternatively, the said other counter-facing surface can be conical or convex, touching the surface S around the zone L.

To explain the functioning of the sealing device shown in FIGS. 1-2, it is assumed that the outwards-facing sealing surface, formed as the segment S, is arranged on a pivotally mounted valve flap, while the counter-facing surface M is fixed and constitutes the inner boundary of an annular seat 9, the centre plane of which preferably coincides with the plane A. The pivot axis V of the valve flap is parallel or substantially parallel with the said plane, and, as can be seen in FIG. 1, should be located eccentrically relative to the plane A, namely, on the same side of it as the intersection point 10 between the two lines 11 and 12 normal to the sealing surfaces, from the points 5 and 6 respectively. It is assumed that, as in known butterfly valves, the pivot axis V also has a laterally eccentric position, which in this case means that the axis should be located on the opposite side (on the right in FIGS. 1-2) of the centre point normal 13 of the plane A, relative to the intersection point 10.

With the pivot axis V arranged in this way, then when the valve flap is rotated towards the closed position, this direction of rotation being clockwise in FIG. 1, i.e. as shown by the arrow 14, every small surface element on the sealing surface S of the flap is moved in an oblique direction towards the fixed sealing surface M until the closed position shown in the Figure is reached, where ideally all the surface elements engage simultaneously with counter-facing surface elements of the surface M.

The manner in which engagement takes place is shown geometrically in FIG. 1 for four points on the sealing surface S, namely the two outer intersection points 5 and 6 on the plane of symmetry I—I and points 15 and 16 on the vertical planes 17 and 18 respectively, taken as shown in FIG. 2. During the closing movement the point 5, like all the other points on the valve flap, is caused to rotate around the pivot axis V and thus follows the path which is represented by the arrow P$_5$ and such as would be made if a pair of compasses were set up on V in FIG. 1 and an arc drawn through 5. The engaging of the point on the seat occurs with a wedge angle $\alpha$ which is the angle between the line 11 normal to the surface and the connecting line 5—V. In similar way, the point 6 interferes with the seat in the arc direction indicated by the arrow P$_6$, the line 12 normal to the surface and the connecting line 6—V forming between them the wedge angle $\beta$.

To demonstrate the engagement of the other two points, the projection of the intersection 19 between the toroidal figure T and the plane 17, and also the corresponding intersection 20 with the plane 18 have been inserted in FIG. 1. The part of these intersections which falls within the segment S shows which profile the counter-facing sealing surface M has in the respective vertical sections; and if, in the same way as described above, the arc-shaped movement paths for the points 15 and 16 are drawn as illustrated with the arrows P$_{15}$, P$_{16}$, it can be seen clearly from the Figure that a wedge-wise engagement of the same character as for the points 5 and 6 in the plane of symmetry will occur. The same applies for each and every point located along the engagement line or engagement zone L.

For a specific toroidal figure the size of the wedge angle depends on the relative position of the plane A and the pivot axis V. With the latter position remaining the same, the higher the left-hand intersection point 5 moves up the generatrix G and the lower down the point 6 is placed on the right, the greater does the wedge angle become. If the distance between the pivot axis V and the centre point normal 13 is reduced, the wedge angle is reduced by a corresponding amount. A technical advantage of the sealing surface geometry described here compared with known devices, which is very valuable in the design of butterfly valves, is that it allows large wedge angles, which while eliminating the risk of a valve flap becoming jammed fast in the seat still meets the requirement that the valve flap should be virtually statically balanced. If in fact in the design work a start is made from a position of the pivot axis V near to the centre point normal 13 in FIG. 1 and at a specific axial distance from the plane A it is at least theoretically possible to choose freely which wedge angle will apply at the points 5 and 6. The specific direction for the seat tangent at every point is then obtained, and it then only remains to find the curved line which satisfies the condition that, when it forms the generatrix for the toroidal segment, it will pass through the two points and touch the respective seat tangent there. Naturally, it must be ensured here that the part of the curved line which defines the toroidal segment is given such a shape that the valve flap can move freely away from the seat at all points on its circumference.

For many applications it is a requirement that a sufficiently high sealing surface pressure be obtained at all the points on the circumference with the least possible external moment acting in the closing direction 14. For this purpose, it is preferable that there should be a wedge angle on the left of the pivot axis V (corresponding to the angle $\alpha$ at the plane of symmetry) which is substantially equal to the wedge angle on the right angle of the axial line (corresponding to the angle $\beta$). With the geometry of the device in FIG. 1 this is achieved if it is ensured that the pivot axis is located somewhere within the area designated 21.

With reference to FIGS. 3 and 4 which show the sealing device in two important applications, the way in which the position of the pivot axis is selected, bearing in mind the requirements named here, will now be explained in more detail. In these Figures the same reference symbols are used for the construction elements which correspond to those described above.

The non-return valve shown in FIG. 3 is of the type which is described in greater detail in Swedish Pat. No. 7308107-7 (publ. No. 383 401) for which reason basically only the construction of the sealing device is described here. The valve comprises a valve housing 22 which forms internally a through-duct 23 and has a seat 24 extending round this, with its plane intersecting the through-duct. The valve member 25 which is formed as a dish-shaped valve flap is pivotally mounted by means of trunnion pins which are fitted in the housing and in the side edges of the valve flap and are located along the pivot axis V'. The valve member can move easily according to the flow of medium through the duct 23, so that it can pivot from an open position, shown in the Figure in thin lines, into its closed position by rotating counterclockwise as shown by the arrow 14.

Around the periphery of the valve flap 25 which is made hard by means of a welded-on layer 26 of Stellite or the like there extends a first sealing surface which is convex and shaped as mentioned above as an obliquely cut toroid segment $S'_1$. The surface can be produced, for instance, in an N.C. machine by turning it with the axis of rotation $R'$ of the toroid $T'$ as the centre, the point of the cutting tool being moved along the generatrix $G'$ of the toroid. In a similar way, on the seat 24 which is similarly covered with hard metal another sealing surface is produced which is concave and is designated $S'_2$. This can be congruent with the first sealing surface $S'_1$ which means that, after turning and possibly grinding, the pair of sealing surfaces which is to be incorporated in a specific valve can be lapped by machine, with the axis of the toroid again being used as the centre of rotation for the moving part, which can be either the valve flap that is to be incorporated in the finished valve or a so-called master.

With a pair of sealing surfaces produced in this way the sealing function is not restricted to a specific localised engagement line, but engagement can occur over an undefined part of the sealing surface width. However, if it is desired to obtain a markedly greater contact pressure at a specific zone located, for example, in the centre plane $A'$ of the sealing surfaces, it is possible to achieve such a sealing function by modifying the generatrix $G'$ for one of the surfaces, for example, the seat surface $S'_2$, so that its curvature is somewhat less than the curvature of the flap surface generatrix. The possibility of lapping to match each other is still afforded in this case.

Since, as is known with non-return valves, it is desired to arrange the valve member so that it is both statically and dynamically unbalanced, in order thereby to achieve rapid closing and low flow resistance when the valve is open, the choice of location for the pivot axis $V'$ in this case is such that considerable lateral eccentricity is obtained, i.e. a position corresponding to the right-hand end of the area 21 in FIG. 1.

When the invention is used in a shut-off or regulating valve, on the other hand, it is expedient to try to avoid a lack of balance in the movable valve member. For the former application, of which FIG. 4 shows an example, the position of the pivot axis $V'''$ is therefore chosen near to the centre point normal line 13, so that the measurement e is small, whereby the pressure of the medium on the valve flap in the closed position has an almost symmetrical effect relative to the axis. Similar positioning of the pivot axis is also to be recommended for a regulating valve, but in this case the aim should be a flap construction wherein the total force effect of the medium, that is, both the static and the dynamic moment, seeks to rotate the valve flap in one and the same direction, so that hysteresis in the regulating function is prevented over the whole operating range.

The sealing device of the shut-off valve comprises a first sealing surface $S''$ which is located on the periphery of the valve flap 27 and consists of a toroid segment shaped in accordance with one of the alternatives discussed above with reference to FIG. 1, but preferably based on a convex curved line $G''$. In a known way, in the valve housing 28 there is a radial recess 29 formed by a machined cut-out made in the housing wall and a clamping ring 31 fixed therein by means of screws 30, the inner part of this clamping ring forming an encircling shoulder. A seat ring 32 is fitted in the recess 29, having an external diameter which is less than the diameter of the base of the recess so that, in a known way the seat ring can be displaced to some extent in the radial direction, while its internal diameter should be so adapted to the sealing surface $S''$ that the interior 33 of the ring, which forms the other sealing surface, will engage against the periphery of the valve flap along a specific average sealing line $L''$ when the valve is in its closed position.

Preferably, the seat ring 32, which is an oval tube in section, or which may be C-shaped, is given a cross-section profile on the interior 33 such that the curvature is appreciably greater than the curvature of the curved line of the toroid segment, which should also be the case when the curved line is concave. The wedge-like engagement between the two sealing surfaces therefore occurs substantially by linear contact.

As a result of this, when the closed position shown in FIG. 4 is assumed, the seat ring 32 may flex somewhat by virtue of the inwards-facing part of the ring cross-section being deformed in the radial direction, which in turn means that the surface pressure is distributed in a peripheral direction. To the same end it may be expedient, when the valve is being assembled, to ensure first that the seat ring has retained its ability to move radially in the recess 29, after which the valve is closed so that the sealing surface $S''$ is pressed forcibly against the interior 33 of the ring. The planar shape of the ring is thereby altered to the same shape as that of the sealing surface $S''$ in the plane of the engagement line $L''$. If the latter planar shape is oval, which is the case with the toroid shape shown in FIG. 1, where the measurement between the points 5 and 6 is less than the greatest transverse measurement for the intersection L (which is located between the points 34 and 35 in the direction of the pivot axis V), ovality consequently arises in the seat ring 32 as well, the long axis being located in the same direction as the pivot axis $V'''$. This ovality can be "frozen" before the assembly work is finished by tightening the screws 30 once and for all while keeping the valve flap in the closed position, so that the ring is prevented from regaining its original shape. Consequently, a substantially uniform, wedge-wise engagement round the circumference is obtained in operation, without any appreciable slipping between the sealing surfaces.

As will already be evident from the description of the examples shown, the shaping of the sealing surfaces which is characteristic of the invention may be applied to one or both of the sealing surfaces in a valve, and here the alternative convex and concave surface shaping may in principle be selected or combined freely. Thus, a shut-off or regulating valve can have a reversed sealing surface configuration to that shown in FIG. 4, so that the valve seat is constructed with a concave sealing surface with a toroidal shape, while the valve flap bears around its periphery a sealing ring with a round cross-section, made of an elastic material.

From the aforegoing it will be appreciated that a valve comprising a sealing device according to the invention affords considerable advantages, due to its typical sealing surface shaping, both in the production process and with respect to functioning.

I claim:

1. A valve comprising a body defining a valve seat lying substantially in a plane and through which a flow passage extends, and a valve member having a pivot axis parallel to said plane and spaced to one side thereof about which said valve member is swingable to and from a closed position wherein a peripheral sealing surface on said valve member is engaged with an opposing sealing surface on said valve seat, said valve being characterized by:
  one of said sealing surfaces having the shape of a segment of the surface of a toroid generated by rotating a curved line, as a generatrix, about an axis of rotation, said segment being taken between a pair of parallel planes
  (a) the normals to which are inclined with respect to said axis of rotation and
  (b) each of which intersects said toroid all around the same.

2. The valve of claim 1, further characterized by:
  (1) said one sealing surface being convex, and
  (2) the other of said sealing surfaces being concave and congruent to said one sealing surface.
3. The valve of claim 1, further characterized by:
  said curved line being an arc of a circle.
4. The valve of claim 1, further characterized by:
  the other of said surfaces being defined by a substantially resilient ring having a cross-section curvature of smaller radius than the radius of curvature of said curved line to provide for substantially line contact engagement between said surfaces.

* * * * *